(12) United States Patent
Hartwich et al.

(10) Patent No.: US 11,088,868 B2
(45) Date of Patent: *Aug. 10, 2021

(54) METHOD FOR COMMUNICATING BETWEEN A MICROCONTROLLER AND A TRANSCEIVER COMPONENT

(71) Applicant: Robert Bosch GmbH, Stuttgart (DE)

(72) Inventors: Florian Hartwich, Reutlingen (DE); Arthur Mutter, Neuhausen (DE); Steffen Walker, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/616,783

(22) PCT Filed: May 24, 2018

(86) PCT No.: PCT/EP2018/063614
§ 371 (c)(1),
(2) Date: Nov. 25, 2019

(87) PCT Pub. No.: WO2018/219766
PCT Pub. Date: Dec. 6, 2018

(65) Prior Publication Data
US 2020/0084064 A1 Mar. 12, 2020

Related U.S. Application Data

(63) Continuation of application No. PCT/EP2018/063614, filed on May 24, 2018.

(30) Foreign Application Priority Data

Jun. 2, 2017 (DE) .......................... 102017209433.8

(51) Int. Cl.
*H04J 1/00* (2006.01)
*H04L 12/40* (2006.01)
(Continued)

(52) U.S. Cl.
CPC .......... *H04L 12/40032* (2013.01); *H04J 1/18* (2013.01); *H04J 3/1682* (2013.01)

(58) Field of Classification Search
CPC ........... H04L 12/40032; H04L 12/4003; H04L 25/0272; H04L 12/40006; H04J 1/18; H04J 3/1682
See application file for complete search history.

(56) References Cited

U.S. PATENT DOCUMENTS

2009/0265489 A1* 10/2009 Replogle ........... H04L 12/40006
710/69
2012/0233374 A1* 9/2012 Whitefield .............. G06F 13/20
710/313
(Continued)

FOREIGN PATENT DOCUMENTS

DE 102015105110 A1 10/2016
EP 2688246 A1 1/2014

OTHER PUBLICATIONS

International Search Report for PCT/EP2018/063614, dated Sep. 3, 2018.
(Continued)

*Primary Examiner* — Abdelnabi O Musa
(74) *Attorney, Agent, or Firm* — Norton Rose Fulbright US LLP; Gerard Messina

(57) ABSTRACT

A method for communicating between a microcontroller and a transceiver component. The microcontroller includes a first pin for transmitting output data to the transceiver component. The microcontroller includes a second pin for receiving input data from the transceiver component, which includes a first input for receiving the output data. The transceiver component includes a first output for transmitting the input data. The transceiver component includes an interface for a data bus. The transceiver component transmits output data via the interface and receiving input data via (Continued)

the interface. The transceiver component includes an additional function device with a second input and a second output. Additional data are at least intermittently transferred from the first pin to the second input via the first input, and/or from the second output via the first output to the second pin. A device and a computer program via which this method may be carried out.

18 Claims, 1 Drawing Sheet

(51) Int. Cl.
*H04J 1/18* (2006.01)
*H04J 3/16* (2006.01)

(56) References Cited

U.S. PATENT DOCUMENTS

| | | | | |
|---|---|---|---|---|
| 2012/0257655 A1* | 10/2012 | Muth | ................ | H04L 12/40039 |
| | | | | 375/219 |
| 2015/0178240 A1* | 6/2015 | Schmitz | .............. | G06F 13/4068 |
| | | | | 710/106 |
| 2017/0257140 A1* | 9/2017 | De Haas | ............. | H04L 25/0272 |

OTHER PUBLICATIONS

ISO 11898-2:2016.
ISO 11898-1:2015.

\* cited by examiner

METHOD FOR COMMUNICATING BETWEEN A MICROCONTROLLER AND A TRANSCEIVER COMPONENT

FIELD OF THE INVENTION

The present invention relates to a method for communicating between a microcontroller and a transceiver component which process input data and output data that are transferred via a data bus.

BACKGROUND INFORMATION

The microcontroller transmits the output data to the transceiver component via an interface. The transceiver component transmits the output data via the data bus. The input data are received by the transceiver component via the data bus and transmitted to the microcontroller via the interface. The interface includes a TX pin and an RX pin at the microcontroller and at the transceiver component.

Additional functions may be implemented in the transceiver component, which are used within the scope of the transfer of input data or output data. These functions may utilize or generate additional data. The additional data are exchanged with the microprocessor via one or multiple additional interfaces. For this purpose, thus far two or more additional pins at the microprocessor have been necessary.

An improved interface is desirable.

SUMMARY OF THE INVENTION

This is achieved by a method and a device according to the descriptions herein. A computer program for implementing the method is likewise provided.

With regard to the method, a communication between a microcontroller and a transceiver component is provided, the microcontroller including a first pin for transmitting output data to the transceiver component, the microcontroller including a second pin for receiving input data from the transceiver component, the transceiver component including a first input for receiving the output data, the transceiver component including a first output for transmitting the input data, the transceiver component including an interface for a data bus, the transceiver component transmitting output data via the interface and receiving input data via the interface, the transceiver component including an additional function device with a second input and a second output, characterized in that additional data are at least intermittently transferred from the first pin to the second input via the first input, and/or from the second output to the second pin via the first output. Additional data may thus be exchanged between the microcontroller and a transceiver component without an additional interface.

Received output data and additional data may be demultiplexed at the first input, and/or input data and additional data for transmitting are multiplexed at the first output. This allows a particularly simple implementation.

The additional data and the output data may be transferred in a time-division multiplex method, or the additional data and the input data are transferred in a time-division multiplex method, the additional data being transferred at predefined points in time. This allows a deterministic transmission of the additional data.

The microcontroller and/or the transceiver component may transfer(s) the additional data in response to a switch-on signal, the switch-on signal being transferred from the first pin to the first input and/or from the first output to the second pin. This allows targeted triggering of the transfer of the additional data.

The microcontroller and/or the transceiver component may transfer(s) the additional data in response to the switch-on signal for a predefined time period. The time period is thus deterministic.

The microcontroller and/or the transceiver component may end(s) the transfer of the additional data in response to a switch-off signal, the switch-off signal being transferred from the first pin to the first input and/or from the first output to the second pin. This allows a deterministic transfer of the output data and/or the input data.

The microcontroller may include a control pin that is connected to a standby pin of the transceiver component, the additional data being transferred in response to the receipt of a switch-on signal, which is represented by a first bit sequence that is transferred from the control pin to the standby pin, and/or the transfer of the additional data being ended in response to the receipt of a switch-off signal, which is represented by a second bit sequence that is transferred from the control pin to the standby pin. The bit sequences provide a flexible option for encoding a switch-on signal and/or switch-off signal.

The additional data and the output data may be transferred from the first pin to the first input, and/or the additional data and the input data are transferred from the first output to the second pin, in a frequency-division multiplex method. In this way, the additional data are transferable simultaneously with the input data or the output data.

The output data and/or the input data may be transferred in a signal at a first frequency that is generated with the aid of a non-return-to-zero line code or a non-return-to-zero inverted line code, the additional data being transferred as a signal at a second frequency, and the first frequency being smaller than the second frequency. This implementation is particularly easy to achieve.

The additional data and the output data may be transferred from the first pin to the first input, and/or the additional data and the input data are transferred from the first output to the second pin, in an amplitude-division multiplex method. In this way, the additional data are transferable simultaneously with the input data or the output data.

The first pin may include at least three output switching thresholds for generating at least three output potentials at the first pin, two of the three output switching thresholds being used for transferring the output data, and the other of the at least three output switching thresholds being used for transferring the additional data, and/or the second pin including at least three input switching thresholds for detecting at least three input potentials at the second pin, two of the three input switching thresholds being used for transferring the input data, and the other of the at least three input switching thresholds being used for transferring the additional data.

The input data and/or the output data may be transferred in series. This allows a smooth transition to a serial data bus.

The additional signals may be transferred in the input data and/or the output data. This reduces the complexity of the transfer, and is technically very easy and advantageous to implement, since in comparison to a frequency-division multiplex method, in this case only additional edges are inserted during the transmission of the input data or output data, which are ignored by the CAN protocol.

Bits of the input data may be transferred in series in input messages in frames; for transferring additional data, additional rising and/or falling edges during the period of the transfer of a bit of the input data are transferred, and/or bits of the output data are transferred in series in output messages in frames; for transferring additional data, additional rising and/or falling edges are transferred during the period of the transfer of a bit of the output data.

With regard to the device, a microcontroller and a transceiver component are configured to carry out the method.

The transceiver component advantageously includes a multiplexer/demultiplexer that is configured to demultiplex output data and additional data received at the first input, and to multiplex input data and additional data for transmitting to the first output.

Further advantageous embodiments result from the following description and the drawings.

DETAILED DESCRIPTION

Figure 1:
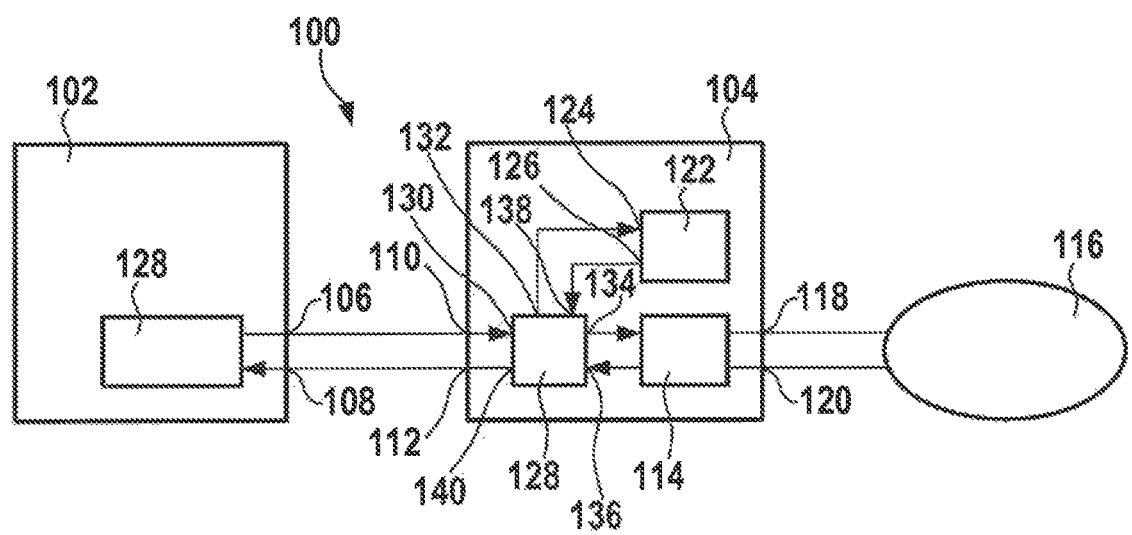
FIG. 1 schematically shows portions of a microcontroller and a transceiver component.

FIG. 1 schematically shows portions of a microcontroller 102 and a transceiver component 104. Microcontroller 102 and transceiver component 104 are part of a device 100 that is configured to carry out the method described below for communicating between microcontroller 102 and transceiver component 104.

Microcontroller 102 includes a first pin 106 for transmitting output data to transceiver component 104.

Microcontroller 102 includes a second pin 108 for receiving input data from transceiver component 104.

Transceiver component 104 includes a first input 110 for receiving the output data.

Transceiver component 104 includes a first output 112 for transmitting the input data.

Transceiver component 104 includes an interface 114 for a data bus 116, with a first contact 118 for high potential (high), for example, and a second contact 120 for low potential (low), for example.

Transceiver component 104 is configured to transmit output data via interface 114, or receive input data via interface 114.

Transceiver component 104 and microcontroller 102 may be configured to transfer the input data and the output data according to a controller area network protocol.

In this case, microcontroller 102 includes a first controller area network controller 128. In this case, interface 114 in transceiver component 104 is a controller area network transceiver.

Transceiver component 104 includes an additional function device 122 with a second input 124 and a second output 126. Additional data are transferred, at least intermittently, from first pin 106 to second input 124 via first input 110, and/or from second output 126 to second pin 108 via first output 112. Transceiver component 104 may be configured to not transmit the additional data via first contact 118 and second contact 120.

The input data and/or the output data may be transferred in series. Transceiver component 104 is configured according to the ISO 11898-2:2016 standard, for example, with only two pins for communicating with first controller area network controller 128. First controller area network controller 128 and optionally the second controller area network controller are, for example, a circuit/implementation that operates according to the ISO 11898-1:2015 standard. In the example, first controller area network controller 128 is integrated into microcontroller 102. The one first pin 106 is denoted by reference symbol TxD. Second pin 108 is denoted by reference symbol RxD.

In addition to the function as an interface, transceiver component 104 also includes an additional function or multiple additional functions, for example partial networking. The one additional function or the multiple additional functions is/may be configurable at run time. For this purpose, the additional data are exchanged with microcontroller 102.

Transceiver component 104 includes a multiplexer/demultiplexer 128 that is configured to demultiplex output data and additional data received at first input 110. Multiplexer/demultiplexer 128 is configured to multiplex input data 136 and additional data 138 for transmitting to first output 112. More precisely, additional data from first pin 106 are transferred via first input 110 to a demultiplexer input 130 of multiplexer/demultiplexer 128. The additional data are separated from the output data in a demultiplexer of multiplexer/demultiplexer 128. The additional data are transferred to second input 124 via a first demultiplexer output 132. The output data are transferred to transceiver 114 via a second demultiplexer output 134. Input data are transferred from transceiver 114 to a first multiplexer input 136 of multiplexer/demultiplexer 128. Additional data are transferred from second output 126 to a second multiplexer input 138 of multiplexer/demultiplexer 128. The input data and the additional data are combined by a multiplexer in multiplexer/demultiplexer 128, and transferred to second pin 108 via a multiplexer output 140 and first output 112.

The type of the additional data is irrelevant for the following method. For the following method, it is irrelevant whether the additional data are transmitted from microcontroller 102 to the additional function, or whether the additional data are transmitted from the additional function to microcontroller 102. The additional data are used, for example, to configure, start, or stop the additional function in order to transmit a status of the additional function to microcontroller 102 or to trigger a response by microcontroller 102.

Figure 2:
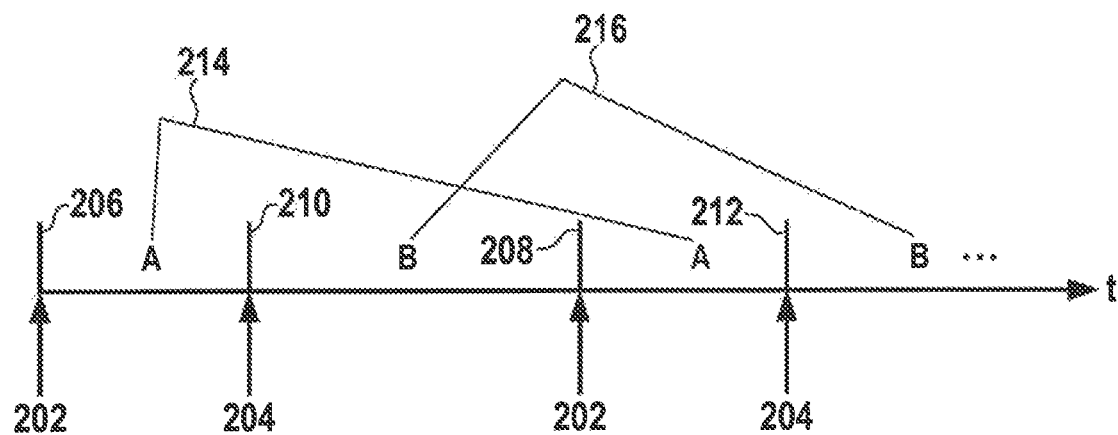
FIG. 2 schematically shows portions of a communication with the aid of a time-division multiplex method.

FIG. 2 illustrates portions of a method by way of example for communicating between microcontroller 102 and transceiver component 104.

FIG. 2 illustrates a sequence on a time axis t, in which on the one hand the additional data and the output data are transferred in a time-division multiplex method, and in which on the other hand the additional data and the input data are transferred in a time-division multiplex method. Transceiver component 104 may prevent a transmission of the additional data via transceiver 114 in a time-controlled manner. Whenever the additional data are transferred according to the time-division multiplex method, for example a transfer between transceiver 114 and multiplexer/demultiplexer 128 is prevented in multiplexer/demultiplexer 128.

Microcontroller 102 and transceiver component 104 are configured, for example, to transfer the additional data in response to a switch-on signal 202. It is also possible for only microcontroller 102 or only transceiver component 104 to be configured to transfer the additional data in response to switch-on signal 202. Switch-on signal 202 is transferred, for example, from first pin 106 to first input 110. Switch-on signal 202 may also be transferred from first output 112 to second pin 108.

Microcontroller 102 and transceiver component 104 are configured to end the transfer of the additional data in response to a switch-off signal 204. It is also possible for only microcontroller 102 or only transceiver component 104 to be configured to end the transfer of the additional data in response to switch-off signal 204. Switch-off signal 204 is transferred, for example, from first pin 106 to first input 110. Switch-off signal 204 may also be transferred from first output 112 to second pin 108.

The additional data may be transferred at a predefined or predefinable point in time. The predefinable point in time is specified by the transfer of switch-on signal 202. FIG. 2 illustrates a first point in time 206 and a second point in time 208 at which switch-on signal 202 is transferred in each case.

The transmission of the additional data may be ended at a predefined or predefinable point in time. The predefinable point in time is specified by the transfer of switch-off signal 204. FIG. 2 illustrates a third point in time 210 and a fourth point in time 212 at which switch-off signal 204 is transferred in each case.

FIG. 2 illustrates an example in which a first time period 214 is present in each case between first point in time 206 and third point in time 210, and between second point in time 208 and fourth point in time 212. In first time period 214, communication takes place exclusively between microcontroller 102 and transceiver component 104 for transmitting the additional data. These first time intervals in which only the additional data are transferred are denoted by reference character A in FIG. 2.

FIG. 2 illustrates an example in which a second time period 216 is present in each case between third point in time 210 and second point in time 208, and after fourth point in time 212. In second time period 216, communication takes place exclusively between microcontroller 102 and transceiver component 104 for transmitting the input data and the output data. The time-division multiplex method via which input data and output data are transferred may be based on the requirements at interface 114. These second time intervals in which the input data or the output data are transferred are denoted by reference character B in FIG. 2.

The switch-on signal or the switch-off signal could be derived from the data bits that are transferred via the bus system. For example, for a CAN bus the end of frame (EOF) field could be detected, and the additional data would be transferred during this time period, since the EOF field corresponds to a long sequence of recessive bits. During this time period, links 134 and 136 between multiplexer/demultiplexer 128 and transceiver 114 would be separated. An additional circuit in multiplexer/demultiplexer 128, for example, continues to observe CAN bus signal at 136, and may discontinue the separation of transceiver 114 if an error is detected on the CAN bus.

The lengths of first time period 214 and of second time period 216 may be different. In the example from FIG. 2, first time intervals A and second time intervals B repeat in alternation (ABAB). Other sequences may also be provided, for example ABBABB or ABBABABBA. First time intervals A or second time intervals B that start at different points in time may have different lengths.

Microcontroller 102 or transceiver component 104 may be configured to transfer the additional data for a predefined time period 214 in response to switch-on signal 202.

After switch-on signal 202 is transferred, for example a controller area network transceiver function is deactivated in transceiver component 104. First input 110 at transceiver component 104 then has no effect on data bus 116, which in this case is configured as a controller area network bus. The controller area network bus has no effect on first output 112.

Microcontroller 102 and transceiver component 104 may thus communicate the additional data without resulting effects on data bus 116.

If the controller area network protocol is used for transferring the additional data, i.e., if the second controller area network controller is contained on transceiver component 104, microcontroller 102 and transceiver component 104 may agree on when they will next communicate exclusively with one another. This may be periodic, for example once per second. The microcontroller or transceiver component 104 may also make this agreement based on a controller area network frame that is transferred.

After the transmission of the additional data has concluded, the controller area network transceiver function in transceiver component 104 is activated in order to transfer input data and output data.

Microcontroller 102 may include a control pin that is connected to a standby pin of transceiver component 104, the additional data being transferred in response to the receipt of switch-on signal 202, which is represented by a first bit sequence that is transferred from the control pin to the standby pin. The transfer of the additional data may be ended in response to the receipt of switch-off signal 204, which is represented by a second bit sequence that is transferred from the control pin to the standby pin.

The first bit sequence is, for example, 01010101 with 1 μs per bit, and means that the exclusive communication is to start.

The second bit sequence is, for example, 00110011 with 1 μs per bit, and means that the exclusive communication is to end.

A third bit sequence includes only 1, for example, and is transmitted for longer than 1 ms in order to switch on the standby mode.

A fourth bit sequence includes only 0, for example, and is transmitted for longer than 1 ms in order to switch off the standby mode.

Other bit sequences may also be provided.

Alternatively, the additional data may be transferred in a frequency-division multiplex method together with either the input data or the output data. The additional data and the output data are transferred from first pin 106 to first input 110 via the frequency-division multiplex method. The additional data and the input data are transferred from first output 112 to second pin 108 via the frequency-division multiplex method.

The output data and/or the input data are transferred, for example, via signals at a first frequency that is generated with the aid of a non-return-to-zero line code or a non-return-to-zero inverted line code. The additional data are transferred as signals at a second frequency, the first frequency being smaller than the second frequency.

Alternatively, the additional data may be transferred in an amplitude-division multiplex method. The additional data and the output data are transferred from first pin 106 to first input 110 in the amplitude-division multiplex method. The additional data and the input data are transferred from first output 112 to second pin 108 in the amplitude-division multiplex method.

First pin 106 includes, for example, at least three output switching thresholds for generating at least three different output potentials at first pin 106.

Two of the three output switching thresholds are used for transferring the output data. The other of the at least three output switching thresholds is used for transferring the additional data.

Second pin 108 includes, for example, at least three input switching thresholds for detecting at least three different input potentials at second pin 108.

Two of the three input switching thresholds are used for transferring the input data. The other of the at least three input switching thresholds is used for transferring the additional data.

Alternatively, the additional data are transferred in the input data and/or the output data.

Bits of the input data are transferred in series, for example in input messages in frames. For transferring additional data, for example additional rising and/or falling edges are transferred during the period of the transfer of a bit of the input data. The input data are situated in a second time interval of the input messages that is different from the first time interval of the input messages.

Additionally or alternatively, bits of the output data may be transferred in series in output messages in frames. For transferring additional data, for example additional rising and/or falling edges are transferred during the period of the transfer of a bit of the output data. The output data are situated in a second time interval of the output messages that is different from the first time interval of the output messages.

When the controller area network protocol is used, bits with bit lengths in the range of 2 µs to 500 ns are used. The controller area network controller normally samples bits in their second bit half. In addition, the controller area network controller ignores changes in value (0/1) prior to a sampling point when the bit is recessive, and the controller area network controller has received a dominant bit beforehand.

An additional logic system is implemented in microcontroller 102, via which microcontroller 102 is configured to insert data in a first bit half of a bit with the aid of sub-bits. An additional logic system is implemented in transceiver component 104, via which transceiver component 104 is configured to receive, remove, and evaluate these sub-bits. "Removal" means, for example, that the controller area network transceiver no longer "sees" the sub-bits in transceiver component 104.

A computer program may be configured to carry out the method for communication via one of the described procedures.

What is claimed is:

1. A method for communicating between a microcontroller and a transceiver component, the method comprising:
    transferring additional data at least intermittently between an additional function device within the transceiver component and the microcontroller by transferring the additional data from: (i) a first pin of the microcontroller to a second input of the additional function device via a first input of the transceiver component, and (ii) a second output of the additional function device of the transceiver component via a first output of the transceiver component to a second pin of the microcontroller;
    wherein the microcontroller includes the first pin for transmitting output data to the transceiver component, the microcontroller including the second pin for receiving input data from the transceiver component, the transceiver component including the first input for receiving the output data from the microcontroller, the transceiver component including the first output for transmitting the input data to the microcontroller, the transceiver component including a transceiver for a data bus, the transceiver component transmitting to the data bus the output data from the microcontroller via the transceiver and receiving the input data from the data bus for the microcontroller via the transceiver, wherein the additional function device is separate from the transceiver;
    wherein the additional data and the input data are transferred, from the first output to the second pin of the microcontroller, multiplexed together in a time-division multiplex method.

2. The method of claim 1, wherein the input data and the additional data are multiplexed together at the first output.

3. The method of claim 2, wherein the additional data and the output data are transferred in a time-division multiplex method, the additional data being transferred at predefined points in time.

4. The method of claim 3, wherein the microcontroller and/or the transceiver component transfer(s) the additional data in response to a switch-on signal, the switch-on signal being transferred from the first pin to the first input and/or from the first output to the second pin.

5. The method of claim 3, wherein the microcontroller includes a control pin that is coupled to a standby pin of the transceiver component, the additional data being transferred in response to the receipt of a switch-on signal, which is represented by a first bit sequence that is transferred from the control pin to the standby pin, and/or the transfer of the additional data being ended in response to the receipt of a switch-off signal, which is represented by a second bit sequence that is transferred from the control pin to the standby pin.

6. The method of claim 4, wherein the microcontroller and/or the transceiver component transfer(s) the additional data in response to the switch-on signal for a predefined time period.

7. The method of claim 4, wherein the microcontroller and/or the transceiver component end(s) the transfer of the additional data in response to a switch-off signal, the switch-off signal being transferred from the first pin to the first input and/or from the first output to the second pin.

8. The method as recited in claim 1, wherein the transceiver component includes a multiplexer/demultiplexer, and wherein the transceiver within the transceiver component receives the output data for the data bus from the microcontroller via the multiplexer/demultiplexer, and wherein the transceiver within the transceiver component transmits the input data from the data bus to the microcontroller via the multiplexer/demultiplexer.

9. The method as recited in claim 8, wherein the transferring of the additional data includes transferring the additional data from: (i) the first input of the transceiver component to the second input of the additional function device via the multiplexer/demultiplexer, and (ii) the second output of the additional function device to the first output of the transceiver component via the multiplexer/demultiplexer.

10. A method for communicating between a microcontroller and a transceiver component, the method comprising:
    transferring additional data at least intermittently between an additional function device within the transceiver component and the microcontroller by transferring the additional data from: (i) a first pin of the microcontroller to a second input of the additional function device via a first input of the transceiver component, and (ii) a second output of the additional function device of the transceiver component via a first output of the transceiver component to a second pin of the microcontroller;

wherein the microcontroller includes the first pin for transmitting output data to the transceiver component, the microcontroller including the second pin for receiving input data from the transceiver component, the transceiver component including the first input for receiving the output data from the microcontroller, the transceiver component including the first output for transmitting the input data to the microcontroller, the transceiver component including a transceiver for a data bus, the transceiver component transmitting to the data bus the output data from the microcontroller via the transceiver and receiving the input data from the data bus for the microcontroller via the transceiver, wherein the additional function device is separate from the transceiver;

wherein the additional data and the input data are transferred from the first output to the second pin multiplexed together in a frequency-division multiplex method.

11. The method of claim 10, wherein the input data are transferred from the first output to the second pin in a signal at a first frequency that is generated with a non-return-to-zero line code or a non-return-to-zero inverted line code, the additional data being transferred as a signal at a second frequency, and the first frequency being smaller than the second frequency.

12. The method as recited in claim 10, wherein the additional data and the output data are transferred from the first pin to the first input multiplexed together in a frequency-division multiplex method.

13. A method for communicating between a microcontroller and a transceiver component, the method comprising:

transferring additional data at least intermittently between an additional function device within the transceiver component and the microcontroller by transferring the additional data from: (i) a first pin of the microcontroller to a second input of the additional function device via a first input of the transceiver component, and (ii) a second output of the additional function device of the transceiver component via a first output of the transceiver component to a second pin of the microcontroller;

wherein the microcontroller includes the first pin for transmitting output data to the transceiver component, the microcontroller including the second pin for receiving input data from the transceiver component, the transceiver component including the first input for receiving the output data from the microcontroller, the transceiver component including the first output for transmitting the input data to the microcontroller, the transceiver component including a transceiver for a data bus, the transceiver component transmitting to the data bus the output data from the microcontroller via the transceiver and receiving the input data from the data bus for the microcontroller via the transceiver, wherein the additional function device is separate from the transceiver;

wherein the additional data and the input data are transferred from the first output to the second pin multiplexed together in an amplitude-division multiplex method.

14. The method of claim 13, wherein the first pin includes at least three output switching thresholds for generating at least three output potentials at the first pin, two of the three output switching thresholds being used for transferring the output data, and the other of the at least three output switching thresholds being used for transferring the additional data, and/or the second pin including at least three input switching thresholds for detecting at least three input potentials at the second pin, two of the three input switching thresholds being used for transferring the input data, and the other of the at least three input switching thresholds being used for transferring the additional data.

15. The method as recited in claim 13, wherein the additional data and the output data are transferred from the first pin to the first input multiplexed together in an amplitude-division multiplex method.

16. A device for communicating, comprising:
a transceiver component; and
a microcontroller, which includes a first pin for transmitting output data to the transceiver component;
wherein the microcontroller includes a second pin for receiving input data from the transceiver component, the transceiver component including a first input for receiving the output data from the microcontroller, the transceiver component including a first output for transmitting the input data to the microcontroller, the transceiver component including a transceiver for a data bus, the transceiver component transmitting to the data bus the output data from the microcontroller via the transceiver and receiving the input data from the data bus for the microcontroller via the transceiver, and
wherein the transceiver component includes an additional function device with a second input and a second output, wherein the additional function device is separate from the transceiver;
wherein the microcontroller and the transceiver component are configured to perform the following:
transferring additional data at least intermittently between the additional function device within the transceiver component, and the microcontroller by transferring the additional data from: (i) the first pin of the microcontroller to the second input of the additional function device of the transceiver component via the first input of the transceiver component, and (ii) the second output of the additional function device of the transceiver component via the first output of the transceiver component to the second pin of the microcontroller;
wherein the additional data and the input data are transferred from the first output to the second pin multiplexed together in a frequency-division multiplex method.

17. The device of claim 16, wherein the transceiver component includes a multiplexer/demultiplexer to demultiplex the output data and the additional data received at the first input, and to multiplex the input data and the additional data for transmitting to the first output.

18. A non-transitory computer readable medium having a computer program, which is executable by a microcontroller, comprising:
a program code arrangement having program code for communicating between the microcontroller and a transceiver component, by performing the following:
transferring additional data at least intermittently between an additional function device within the transceiver component and the microcontroller by transferring the additional data from: (i) a first pin of the microcontroller to a second input of the additional function device via a first input of the transceiver component, and (ii) a second output of the additional function device of the transceiver component via a first output of the transceiver component to a second pin of the microcontroller;

wherein the microcontroller includes the first pin for transmitting output data to the transceiver component, the microcontroller including the second pin for receiving input data from the transceiver component, the transceiver component including the first input for receiving the output data from the microcontroller, the transceiver component including the first output for transmitting the input data to the microcontroller, the transceiver component including a transceiver for a data bus, the transceiver component transmitting to the data bus the output data from the microcontroller via the transceiver and receiving the input data from the data bus for the microcontroller via the transceiver, wherein the additional function device is separate from the transceiver;

wherein the additional data and the input data are transferred from the first output to the second pin multiplexed together in a frequency-division multiplex method.

* * * * *